United States Patent

DeWolf

[15] 3,648,089
[45] Mar. 7, 1972

[54] COMMUTATING FLUX FIDELITY IMPROVEMENT WINDING

[72] Inventor: Frank T. DeWolf, Erie, Pa.
[73] Assignee: General Electric Company
[22] Filed: Apr. 7, 1970
[21] Appl. No.: 26,294

[52] U.S. Cl. ............................................310/186, 310/188
[51] Int. Cl. ..........................................................H02k 3/20
[58] Field of Search..................310/186, 187, 177, 175, 210, 310/211, 205, 206, 207, 149, 192, 162, 182, 183, 184, 185, 188, 190, 191, 197; 332/65–68

[56] References Cited

UNITED STATES PATENTS

| | | | |
|---|---|---|---|
| 1,912,075 | 5/1933 | Hansen | 310/149 |
| 2,319,614 | 5/1943 | Linville | 310/186 |
| 2,385,199 | 9/1945 | Fisher | 310/188 |
| 3,183,386 | 5/1965 | Miller | 310/149 |
| 3,191,081 | 6/1965 | Faulhaber | 310/207 |
| 3,230,487 | 1/1966 | Pellecchia | 310/183 |

FOREIGN PATENTS OR APPLICATIONS 253,650 7/1926 Great Britain.........................310/187

Primary Examiner—J. D. Miller
Assistant Examiner—R. Skudy
Attorney—James C. Davis, Jr., Edward W. Goebel, Jr., Frank L. Neuhauser, Oscar B. Waddell and Joseph B. Forman

[57] ABSTRACT

In a DC dynamoelectric machine employing one or more commutating poles, machine performance and commutating ability with transient load conditions, cyclic pulsations in its power supply, or both, are enhanced by a commutating flux fidelity improvement winding. The winding comprises a quantity of low-resistance closed circuits equal to the quantity of commutating poles in the dynamoelectric machine. Each circuit encircles a commutating pole in its entirety and the proximate half of an adjacent main pole. A segment of each circuit is recessed in a face of one of the main poles adjacent a gap between the pole face and parallel to the axis of an armature rotatably supported in the machine. In response to load current changes in coils in the armature, distributed magnetic flux density changes occur at the gap. These flux density changes induce a voltage in the recessed segment, resulting in a current in the circuit. An additive flux is fostered in the commutating pole by this current in the circuit. The additive flux develops earlier than the normal commutating pole transient responsive flux. Since this additive flux occurs in advance of the normal commutating pole transient responsive flux, it is more nearly coincident with the causative transient condition and yields improved commutation in a dynamoelectric machine incorporating the flux fidelity improvement winding of this invention.

1 Claim, 7 Drawing Figures

Patented March 7, 1972

INVENTOR.
FRANK T. DE WOLF

BY Edward N. Goebel

HIS ATTORNEY

Patented March 7, 1972 3,648,089

COMMUTATING FLUX FIDELITY IMPROVEMENT WINDING

BACKGROUND OF THE INVENTION

This invention relates to DC dynamoelectric machines, and more particularly, to DC dynamoelectric machines which incorporate one or more commutating poles and which may be subjected to transient loads.

A conventional type of DC dynamoelectric employs a magnetically permeable stator frame in which are mounted a brush support including brushes and magnetic flux sources. An armature is rotatably supported within the stator frame for motion relative to the magnetic flux sources and the frame. The armature includes a plurality of load current carrying coils in a magnetically permeable rotor, and a commutator. The armature coils are connected electrically to the commutator which has a plurality of electrically conductive members called commutator bars. The function of the brushes and the commutator, cooperatively, is to transfer electrical energy between the stationary stator frame and the coils of the rotatable armature through sliding engagement of the brushes with the commutator. This function is termed commutation.

It is well known that in DC dynamoelectric machines, the direction of current flow in an armature coil must be reversed each time the coil undergoes commutation during armature rotation.

During the current reversal in the armature coil a voltage, called a reactance voltage, is induced in the coil. This reactance voltage which is approximately proportional to load current opposes the required load current reversal. A complete neutralization of the reactance voltage would yield essentially sparkless commutation. To reduce sparking in the commutation process, many DC machines incorporate commutating poles, also called interpoles, often, though not necessarily equal in number to the quantity of main poles which supply a primary operating magnetic flux. The commutating poles are located between the main poles and, to supply a commutating pole flux proportional to the reactance voltage, include a winding called a commutating winding, which carries a current proportional to the load current of the machine. The commutating pole flux, then, is substantially proportional to the machine load current and to the reactance voltage as affected by load current. During commutation this commutating pole flux creates a voltage in the armature coils which is of opposite polarity to the reactance voltage. Ideally, the two voltages are equal in magnitude and yield a net coil voltage of zero regardless of the machine load current. Unfortunately, these ideal conditions often do not exist. For example, the commutating pole flux may not be proportional to the load current if that current is excessive. If commutating pole magnetic saturation occurs, the commutating pole flux is no longer proportional to the load current and commutation is accompanied by detrimental sparking. Within economic and spatial limitations the commutating pole structure may generally be designed to avoid undue saturation.

It will be appreciated that the above-described proportionality of commutating pole flux for reactance voltage neutralization must exist during any change in load current in the armature of the machine. During a gradual load current change within machine ratings, the commutating pole flux normally remains instantaneously proportional to the load current. However, during application of a transient load having a high rate of change, termed a shock or impact load, the commutating pole flux often does not remain proportional to the load current.

A shock load imposed on a machine creates a current surge which is simultaneously effective in both the armature and the commutating pole winding, but the commutating pole flux often changes more slowly than the load current. A delay in the change of this flux prevents its development to a value proportional to the change in load current on a timely basis. Since good commutation depends upon the proportionality of the commutating pole flux to the load current, a loss of this proportionality degrades commutation and promotes sparking of the brushes on the commutator.

The achievement of acceptable commutation in DC dynamoelectric machines exposed to abruptly changing load currents has long been a recognized problem. A solution to this problem has recently become more urgent due to the rapid growth in the application of rectified AC electrical power to DC machines. The DC power so derived possesses voltage and current pulsations or ripple not present in normally generated DC electric power. These cyclic pulsations vary with such factors as the frequency of the source of the rectified AC electrical energy, the characteristics of the DC load, and the configuration of the rectifiers employed in the rectification process. Though this ripple is not of great magnitude, it is often sufficient to be a detriment to the commutation process in a DC machine.

OBJECTS OF THE INVENTION

Accordingly, it is an object of this invention to improve commutating ability in DC dynamoelectric machines when such machines are exposed to load transients having a high rate of change. To accomplish the foregoing object, a more specific purpose of this invention is to provide means to establish a commutating pole flux more nearly simultaneously with a reactance voltage induced in a machine as a result of transient load changes.

Another object of this invention is to accomplish the foregoing without altering external electrical connections to the machine.

Yet another object of this invention is to provide means for improving commutation of a DC machine without necessitating a change in external dimensions of the machine.

Still another object of this invention is to effect the foregoing at minimum cost without affecting reversibility of the machine's output.

SUMMARY OF THE INVENTION

Briefly stated, and in accordance with one aspect of this invention, a flux fidelity improvement winding is provided for use in DC dynamoelectric machines having one or more commutating field poles, to improve commutation in these machines. The improvement winding employs a quantity of low-resistance electrical circuits usually equal in number to commutating field poles in a field structure of the machine. Each circuit includes a generally rectangularly formed conductor having a first segment in a recess in one of the main field poles of the field structure, the recess being parallel to the machine's axis. The recess is equal in length to the axial dimension of the main pole and is approximately centrally disposed in an arcuate face thereof. The face is adjacent a gap separating the field structure from an armature supported for rotation relative thereto. The first segments are greater in length than the axial dimension of the main or the commutating field poles, whichever is greater. Each of the first segments is electrically connected at each axial end to corresponding axial ends of third segments. The second and fourth segments serve to electrically connect the corresponding axial ends of the first and third segments of the conductor to form a generally rectangular circuit. The winding thus includes one or more low-resistance circuits each linking a commutating field pole of the field structure to the proximate half of an adjacent main field pole therein.

The commutating pole winding furnishes a magnetic flux which generates a voltage in an armature coil approximately equal and opposite to a reactance voltage developed in the armature coil during commutation. This voltage is essentially proportional to load current since the armature coils carry the load current which creates the reactance voltage. The magnetic flux produced by the commutating pole winding is generally proportional to the reactance voltage and load current at different machine loads, by virtue of a current proportional to the load current passed through the commutating pole winding. If the machine load current changes at a slow rate, the commutating pole flux, for all practical purposes, remains instantaneously proportional to both the load current and the reactance voltage; and the auxiliary winding of this invention is substantially inoperative. If, on the other hand, the load current changes at a high rate, a time constant in the commutating pole flux source or its flux path may so delay development of the commutating pole flux that it does not change proportionately until significantly later than the load current change. In this latter situation, the commutating pole flux is not instantaneously proportional to the reactance voltage. It is to a correction of this lack of instantaneous proportionality that the flux fidelity improvement winding contributes.

The axially directed first segments of the winding, being located in proximity to the armature, are exposed to transient armature current and resultant flux changes. Such changes induce an electromotive force in the circuits of the winding. Since the circuits are of low resistance, a small electromotive force creates a large, nearly coincident current. This current establishes a flux, additive to that derived from the normal commutating pole winding, for improved commutation since the circuits of the winding encircle the commutating poles. The additive flux occurs very nearly coincident with the transient load experienced by the machine, and in advance of the flux resulting solely from the normal commutating pole winding.

The specification concludes with claims particularly pointing out and distinctly claiming the subject matter of this invention. The organization and manner and process of making and using this invention together with benefits and advantages to be realized may be best understood by utilizing the following description and the accompanying drawings, related to a preferred embodiment of the invention.

An identification number assigned to any part or portion in a figure identifies that part or portion in whatever figure that number appears.

DETAILED DESCRIPTION OF THE DRAWINGS

Figure 1:
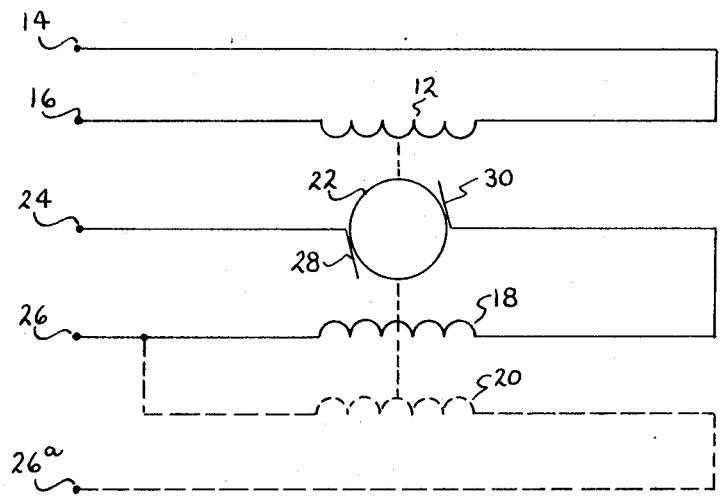
FIG. 1 is an electrical schematic diagram of a conventional DC dynamoelectric machine.

FIG. 1 is an electrical, schematic diagram of a DC dynamoelectric machine and depicts the major electrical elements of such a machine including the windings which serve as sources of the normal main pole and commutating pole fluxes.

Considering first the elements comprising the machine stator, a main field winding 12 represents a plurality of main field coils located on magnetically permeable structures in the stator frame. These coils of the winding 12 may be connected in series, parallel or series-parallel relationship with each other to suit a potential applied to terminals 14 and 16. The applied potential causes a current to flow in the field winding 12 and creates a main magnetic flux in the machine, the field winding 12 being used alone as the main field winding in a shunt wound machine.

Second and third windings 18 and 20, respectively, also represent a plurality of magnetic flux-generating coils in the stator frame. The winding 20 represents a series field winding which is used in combination with the main field winding 12 in a compound wound machine or is used alone as a main pole winding in a series wound machine. Main field flux may also be produced through the use of permanent magnets mounted within the machine.

The second winding 18 is a commutation improvement or commutating pole winding and is connected electrically in series with an armature 22 rotatably mounted in the machine stator. The commutating pole winding attempts to produce commutating flux in a magnetic structure about which it is wound, called a commutating pole, in proportion to a load current in the armature 22. Electrical connections 24 and 26, or 26A if the third winding is incorporated, provided for delivery of power to or from the armature circuit. Brushes 28 and 30 provide a sliding, electrically conductive current path to a commutator on the armature 22 of the machine to effect electrical power transfer from the stationary portions of the armature circuit to the rotatably mounted armature 22. It is to be noted that either the series field winding 20, the commutating pole winding 18, or both, when employed, carry load current and attempt to produce magnetic fluxes proportional to the load current in the armature 22.

Figure 2:
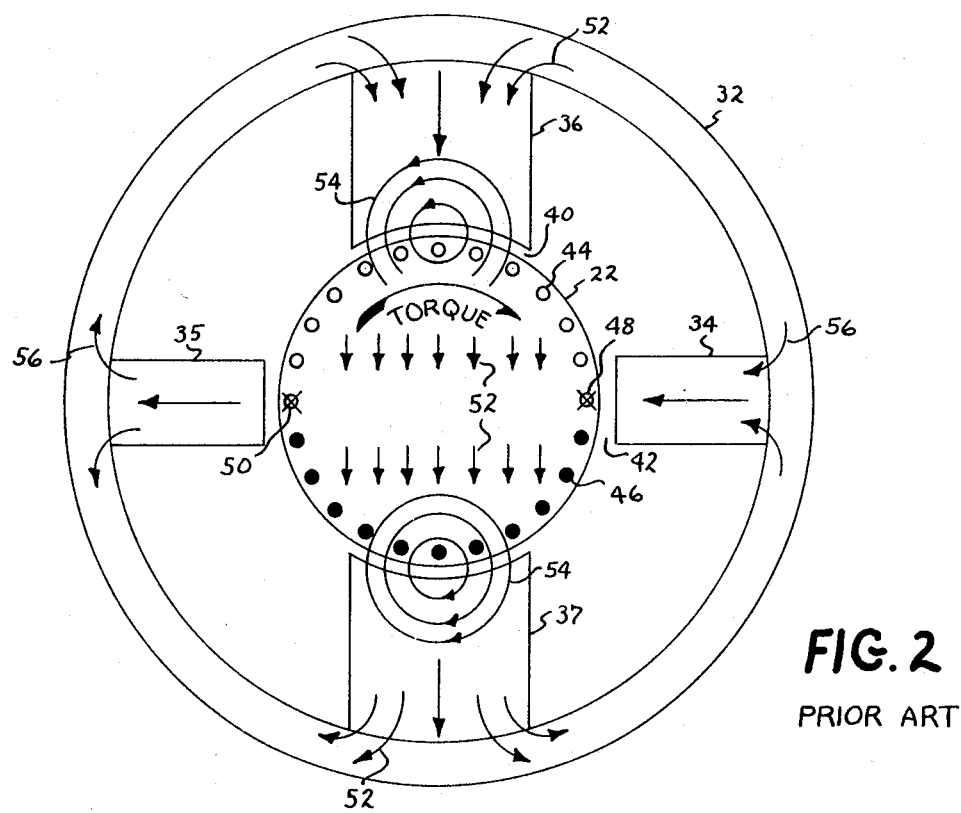
FIG. 2 is a partial cross section of a typical two-pole DC dynamoelectric machine less field windings, taken at right angles to its shaft to indicate component flux paths.

FIG. 2 is a cross-sectional view of a typical two-pole DC dynamoelectric machine and omits all stator windings to more clearly portray flux relationships in the machine. Arrows shown in this representation indicate major component flux paths in the machine without reference to relative flux magnitudes.

The stator frame is indicated in FIG. 2 as 32. Mounted within the stator frame 32 are first and second commutating poles 34 and 35 and first and second main poles 36 and 37, respectively. The commutating poles 34 and 35 are those on which the commutating winding 18 of FIG. 1 is mounted. Either the main field winding 12 of FIG. 1, or the series field winding 20, or both, as explained with reference to FIG. 1, is mounted on the main poles 36 and 37. Although for reasons of clarity neither the main poles 36 and 37 nor the commutating poles 34 and 35 are shown as being of laminar construction, it is to be understood that any or all of the poles 34, 35, 36, and 37 may be so produced, if desired.

The armature 22 is shown centrally located within the stator frame 32. The armature 22 is rotatably mounted and separated from those elements comprising the machine stator by gaps 40 and 42 at the main poles 36 and 37 and the commutating poles 34 and 35, respectively. Mounted in the armature 22 for rotation therewith are a plurality of load current carrying armature coils. Typical coils, which may comprise several parallel electrical paths, are identified as 44 and 46 in FIG. 2. Coils 44 and 46 are differentiated electrically in FIG. 2 by the use of open and solid circles, respectively, to indicate the directions of load current flow. The coils 44 above the horizontal centerline of the commutating poles 34 and 35 are shown as open circles indicating that load current is flowing out of the paper toward the viewer. The coils 46, below the horizontal centerline of the commutating flux poles 34 and 35 are represented by solid, filled circles indicating that they are carrying load current into the paper away from the viewer. Coils 48 and 50, depicted as an open circle superimposed on an "X," and located on the horizontal centerline of the commutating poles 34 and 35, are those coils undergoing commutation; that is, coils in which current reversal is being accomplished.

With the exception of a torque direction arrow, so designated, all arrows in FIG. 2 indicate component magnetic flux paths in the machine. A main flux path, indicated as 52, is produced by the main field winding 12 of FIG. 1 on the main poles 36 and 37 of FIG. 2. The main flux path 52, then, is from the upper of the main poles 36, across the gap 40, through the armature 22, again crossing the gap 40 to the lower of the main poles 37, with a return route through the stator frame 32 to the upper of the main poles 36.

A commutating flux path is denoted by arrows 56 in the commutating poles 34 and 35. It is the flux in this path 56 which must at all times be proportional to load current for ideal commutation. To maintain the flux in path 56 proportional to the load current, it is important that the commutating poles 34 and 35 and the stator frame 32 be proportional so that magnetic saturation does not occur under anticipated load conditions. Further discussion of commutating flux propagation is incorporated in the ensuing description of FIG. 3.

Elliptically shaped flux paths 54 link the main poles 36 and 37 with the armature 22 across the gap 40. The flux in these paths 54 resulting from current flow through armature coils 44 and 46 is called armature reaction flux. The elliptical shape shown is not necessarily the actual flux path shape, but is here used for illustrative purposes. The following description of FIG. 3 presents further discussion of the flux in these flux paths 54.

Figure 3:
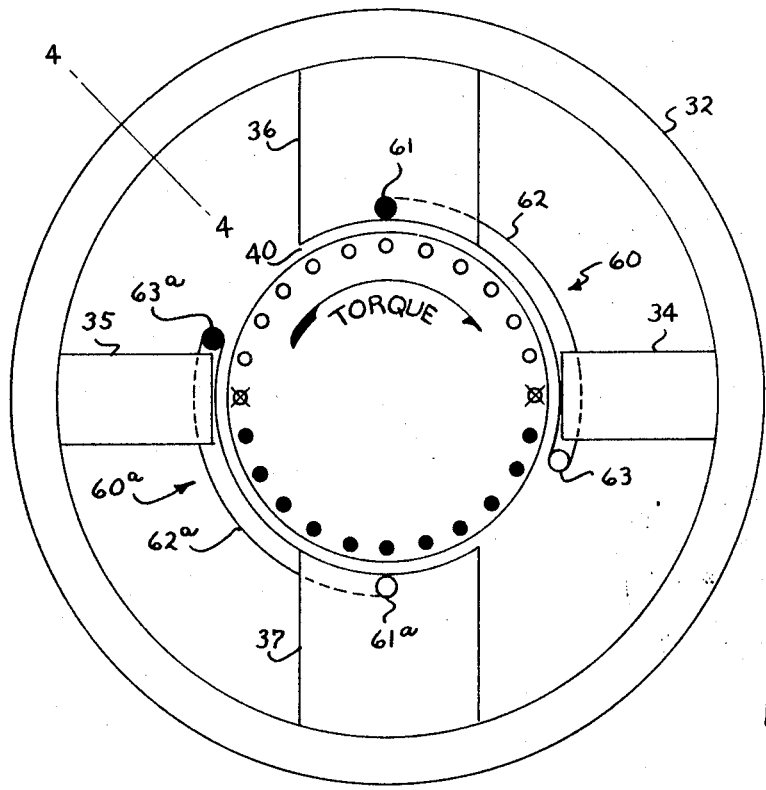
FIG. 3 is a partial cross section of the two-pole machine of FIG. 2, incorporating the instant invention, but for reasons of clarity, omitting the flux paths of FIG. 2.

FIG. 3 shows a basic two-pole DC dynamoelectric machine, in cross section as in FIG. 2, incorporating this invention. The flux paths and most of the part numbers in FIG. 2 are omitted to simplify the drawing.

In accordance with this invention, the dynamoelectric machine incorporates a commutating flux fidelity improvement winding including a low-resistance electrical circuit for each commutating pole. The low-resistance circuits, two in number, are generally rectangular in shape, and each may be produced in a single, continuous unitary circuit or as an assembly of a plurality of members. For descriptive purposes in the ensuing discussion of FIG. 3, only the first circuit 60 of the two identical, generally rectangular circuits 60 and 60A is described in detail. The four sides included in the closed loop, generally rectangular circuits are referred to as segments and are numerically identified. For purposes of correlation, corresponding segments of the two circuits, 60 and 60A are identified by the same numeral. In the first circuit 60, the numerals alone are used. In the second circuits 60A, the numerals are correspondingly applied, followed by the letter "A."

FIG. 3, as a partial cross section of a typical two-pole, DC dynamoelectric machine, does not show the first and second circuits 60 and 60A, respectively, in their entirety. Recessed in the upper main pole 36 is a first segment 61. Extending arcuately from the first segment 61 at the further axial end of the machine is a second segment 62. The second segment 62 is electrically connected at the further axial end to the first segment 61 and to a third segment 63. The third segment 63 is generally parallel to the first segment 61. A fourth segment 64, generally parallel to the second segment 62 but not visible by virtue of the cross-sectional view of FIG. 3, completes the generally rectangular circuit 60. The fourth segment 64 (not shown) electrically connects the nearer axial ends of the first and third segments 61 and 63, respectively. The second and fourth segments 62 and 64, respectively, are of such length as to permit the third segment 63 to be spaced beyond the commutating pole 34 relative to the first segment 61. Each low-resistance, closed-loop circuit of the commutating flux fidelity improvement winding thus encircles one half of a main pole and an adjacent commutating pole, 36 and 34, respectively, in the case of the first circuit 60. This configuration is clarified in FIG. 4 which will be explained in detail in later paragraphs.

In FIG. 3 the same identification practice is employed as was used in FIG. 2 with respect to the direction of current flow in the first segment 61 and the third segment 63 of the first circuit 60. The origin of the load current-producing voltage in FIG. 2, in the case of a motor, is the connected power supply feeding the armature circuits as typified by coils 44 and 46 and the commutating winding 18, of FIG. 1. In contrast, the flux fidelity improvement winding circuits 60 and 60A, FIG. 3, are active current-carrying members only when a voltage is induced in the first segments 61 and 61A of FIG. 3 by the armature reaction flux in the paths 54 of FIG. 2. These circuits 60 and 60A of FIG. 3 are isolated from all external power sources.

With reference to FIG. 3, in light of the discussion of FIG. 2, it is to be noted that the first segments 61 and 61A of the circuits 60 and 60A are essentially centered in arcuate faces of the main poles 36 and 37 abutting the gap 40. At each axial end of the main poles 36 and 37, the first segments 61 and 61A and at the axial ends of the commutating poles 34 and 35 the third segments 63 and 63A extend sufficiently to enable attachment of the second segments 62 and 62A and the fourth segments 64 and 64A (not shown). The flux in the elliptical flux paths 54 shown in FIG. 2 links the armature 22 with the main pole 36 in a counterclockwise direction at the location of first segment 61 of the first circuit 60 and clockwise about first segment 61A of the second circuit 60A in the main pole 37. It is changes in this armature reaction flux in paths 54 of FIG. 2 which induce voltages in the first segments 61 and 61A.

As pointed out in the description of FIG. 2, the intent in a DC dynamoelectric machine is to maintain proportionality between the magnetic flux in the commutating flux path 56 and the armature load current at all times to the end that brush sparking at the commutator is minimized if not eliminated. Properly maintained, this proportionality results in the generation of a voltage equal and opposite to the reactance voltage in the armature coils undergoing commutation. The approximate ratio of these two voltages is provided, as was earlier suggested, by utilizing the armature load current or a portion thereof to develop the flux in the commutating flux path 56. This is sufficient for substantially sparkless commutation under normal conditions of machine operation but often fails to provide acceptable commutation when the machine is subjected to rapidly changing load current.

A rapidly changing load current results in a rapid change in the current in that series circuit of FIG. 1 which includes the armature 22, the commutating winding 18 and, if used, the series field winding 20. The rate of change in current is uniform in all portions of such a series circuit. The process of commutation, however, is concerned with and affected by the instantaneous relationship of commutating flux to load current.

It has been determined that the rate of flux change in the commutating flux path 56 of FIG. 2 significantly lags the rate at which the reactance voltage changes when a high rate load current change occurs. Substantially coincidentally with the change of the reactance voltage, a flux change occurs in the elliptical flux paths 54. This flux change, linking the first segments 61 and 61A of FIG. 3 as it does, induces a voltage therein. This induced voltage is proportional to the rate of flux change and creates a current in the circuits of the flux fidelity improvement winding, the current being substantially directly proportional to the causative voltage and inversely proportional to the resistance of the circuits 60 and 60A.

In the preferred embodiment shown in FIG. 3, the first and second circuits 60 and 60A, respectively, complete the commutating flux fidelity improvement winding for the two-pole, DC dynamoelectric machine depicted. The previously mentioned current flow in these circuits 60 and 60A, in encircling the commutating poles 34 and 35, develops an additive flux therein. This additive flux reinforces the normal commutating pole flux and develops more promptly in response to transient load current changes than the normal commutating flux engendered in the poles by the commutating winding 18 of FIG. 1. This earlier, additive flux improves the ratio of the commutating pole flux to the load current during abrupt load current changes. This improvement results in superior commutating ability in a DC dynamoelectric machine equipped with the commutating flux fidelity improvement winding of this invention.

Figure 4:
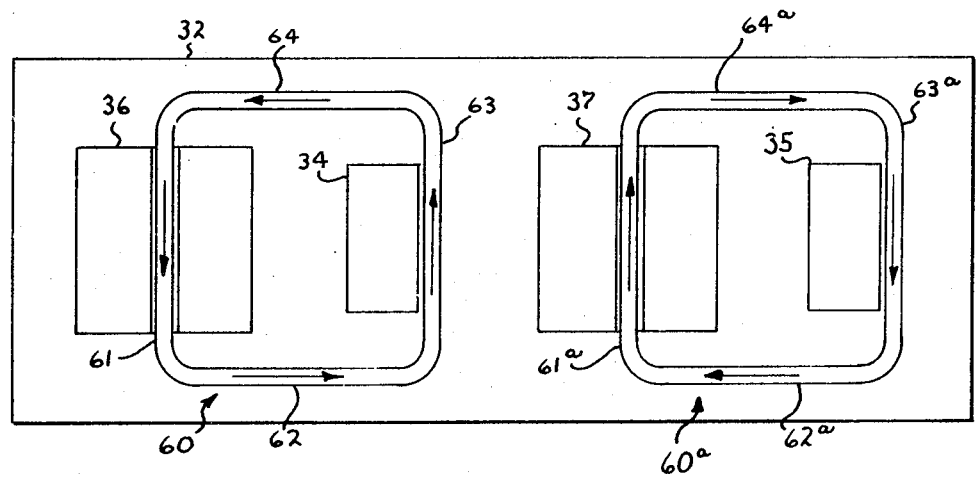
FIG. 4 is a planar development of the stator frame assembly of a DC dynamoelectric machine including the instant invention but omitting field windings for clarity.

FIG. 4 is included to more clearly indicate directions of current flow in the segments of the circuits of the invention, and shows the components of the stator assembly of FIG. 3. The stator frame 32 is shown as if it were cut at section line 4—4 of FIG. 3, and is flat rather than in the form of a ring. The poles of FIGS. 2 and 3 and the flux fidelity improvement winding of FIG. 3 are depicted as if viewed from within the armature. Orientation of FIG. 4 with respect to FIG. 3 may best be established by noting the locations of the first segments 61 and 61A in the two figures. The direction of current flow in the first segments 61 and 61A is consistent with that indicated in FIG. 3, and creates a counterclockwise current flow in the first circuit 60 around the first commutating pole 34 as shown in FIG. 4 and a clockwise flow in the second circuit 60A about the second commutating pole 35. The flux produced by the current in the circuits indicated in FIG. 4 is in such a direction as to augment the flux created by the commutating winding 18 of FIG. 1 in the commutating flux path 56 of FIG. 2.

Test measurements of current circulating in a flux fidelity improvement winding of a DC machine functioning as a motor and deriving its load current from a three phase half-wave rectifier bank with 17 per cent output current ripple indicate that more than 400 per cent of the DC machine's full load current may be induced in the flux fidelity improvement winding. The characteristics of the winding, the size and structure of the machine incorporating the winding, and the nature of transient loads experienced are primary factors influencing the magnitude of the current flow in the circuits of the winding. Test results on a 15-horsepower machine indicate that a conductance of not less than on the order of 400 mho's should be provided in each circuit of the flux fidelity improvement winding, a circuit being that portion of the winding which links adjacent poles. These tests also indicate that an adequate flux fidelity improvement winding can be produced using segments in recesses which occupy as little as about 5 percent of the area of the main pole faces. During a transient load current condition the flux generated by the current in the flux fidelity improvement winding is added to the normal flux of the commutating poles. More significantly, the added commutating pole flux develops at a point in time more nearly coincident with the occurrence of the transient than that flux which results from the normal commutating pole winding 18 of FIG. 1.

Figure 5:
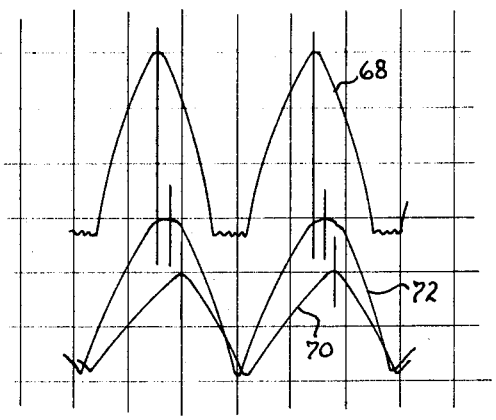
FIG. 5 is a reproduction of oscillograms made during a test of the instant invention and shows the improvement in the commutating pole flux punctuality attributable thereto.

FIG. 5 is a reproduction of oscillograms taken during the operation of a dynamoelectric machine made in accordance with this invention, confirming the commutating poles' improved performance when their normal windings are supplemented by the flux fidelity improvement winding. As in the earlier description, the load current in the armature is pulsating DC derived from a three-phase, half-wave rectifier. This load current oscillogram is shown at 68 in FIG. 5. Curves 70 and 72 are traces of the output flux of a commutating pole before and after, respectively, the incorporation of a flux fidelity improvement winding. Curves 70 and 72 were recorded at the same calibration level of 17,600 lines of flux per centimeter in the vertical direction, the horizontal axis being time. These curves 70 and 72 clearly indicate not only the increase in flux created in the commutating poles but also the improvement in timing of the maximum pole flux, advancing it to be more nearly simultaneous with the load current. The increase in flux is approximately 75 percent. The time lag between a peak in the armature load current and a peak in the pole flux is diminished by about 50 percent. The curve 72 is also indicative of like improvement whether the armature load current is increasing or decreasing.

Figure 6:
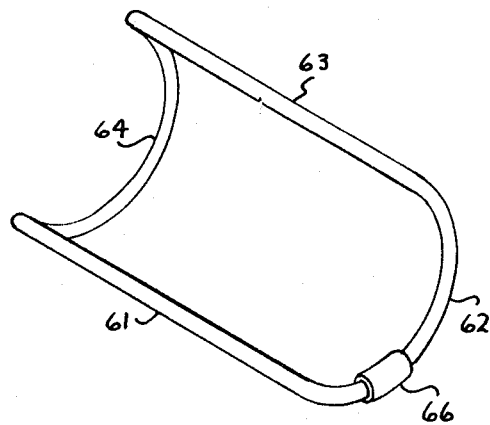
FIG. 6 shows one circuit of the flux fidelity improvement winding in its preferred embodiment.

FIG. 6 is a detailed view of the first circuit 60 of the low-resistance, flux fidelity improvement winding incorporated in FIGS. 3 and 4, represents a preferred embodiment of this invention. The first and third segments 61 and 63 serve to space and electrically connect the second and fourth segments 62 and 64. Similarly, the second and fourth segments 62 and 64, respectively, vary from one machine to another. The configuration is established to suit the stator frame assembly in which the flux fidelity improvement winding, comprising one or more of the circuits of FIG. 6, is to be used. As earlier stated, the use of the term "segment" is for descriptive and definitive reasons only. The four segments 61, 62, 63 and 64 may be two or more highly conductive entities joined electrically and mechanically or, as illustrated in FIG. 6, portions of a single, low-resistance conductor having its ends joined in a low-resistance splice 66.

Figure 7:
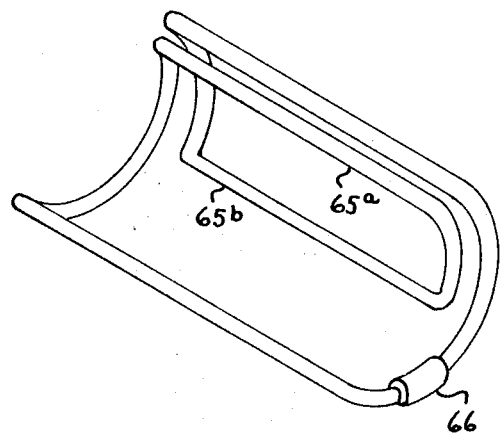
FIG. 7 depicts one alternative embodiment of one circuit.

FIG. 7 shows another of the many possible circuit configurations which may be utilized in practicing the instant invention. Comparison of FIG. 7 with FIG. 6 reveals that an added turn in FIG. 7 distinguishes the two configurations. The added turn includes segments 65A and 65B electrically joined and constituting a multiturn arrangement for use around either an entire commutating pole or one-half of a main pole. Adjustment of the number of turns about a commutating pole or one-half of a main pole alters the effect of the current flow in the circuit so modified and changes the magnitude of the commutating pole flux variation from that achieved by a single turn.

It is well known that mechanical forces are exerted on a current-carrying conductor located in a magnetic field. Portions of the flux fidelity improvement winding experience mechanical forces during operation of a DC dynamoelectric machine in which they are included. The magnitude of the forces is largely dependent upon the rating of the machine and the conductance of the winding. Due to the presence of these forces, embodiments of this invention may require the use of restraining means to maintain particular portions secured in a preferred location.

Application of the fidelity improvement winding of the instant invention to a DC dynamoelectric machine which incorporates a main pole face compensating winding is not suggested. Physically and functionally, the two windings are not compatible. A main pole face compensating winding is normally incorporated to inhibit the flux change on which the fidelity improvement winding is dependent for its successful operation.

This invention is not limited to the specific details of the illustrated embodiments, and it is contemplated that many changes, additions and modifications of these embodiments will occur to those skilled in the art. It is, therefore, intended that the appended claims cover all such changes, additions, and modifications as fall within the true spirit and scope of this invention.

What I claim as new and desire to secure by Letters Patent of the United States is:

1. A DC dynamoelectric machine comprising:
a generally tubular stator frame;
a plurality of main field poles mounted in the stator frame to provide an appropriate first magnetic flux therein; each main pole having a recess provided centrally and axially in its inwardly directed arcuate face;
a commutating winding mounted on at least one commutating pole in the stator frame, means for electrically connecting the commutating winding to a source of excitation current proportional to a load imposed on the DC dynamoelectric machine to yield a second magnetic flux cooperative with the first magnetic flux to improve commutation in the DC dynamoelectric machine;
a commutating flux fidelity improvement winding mounted within the stator frame and having no electrical connections to a power source or load; said flux fidelity improvement winding comprising at least one low-resistance, closed-loop, electrically conductive circuit; said circuit including a plurality of conductive joined segments, at least one of said segments mounted in and projecting bidirectionally beyond the axial recess in one of the main poles and conductively joined at its projecting ends with other segments at each end, at least two of said other segments extended therefrom to terminate in free ends beyond an adjacent commutating pole, said free ends there conductively joined by at least one additional segment, said additional segment completing said electrically conductive circuit, said plurality of conductive joined segments providing a plurality of conductive turns at at least one pole of the machine;
a gap adjacent said first segments of said circuits;
an armature assembly rotatably supported in the stator frame for magnetic interaction therewith through the gap, and for rotation relative thereto, comprising armature coils, a magnetically permeable structure to retain the coils; a commutator and means for electrically interconnecting the coils and the commutator; and a suitable quantity of brushes resiliently biased into sliding engagement with the commutator to conduct electrical energy to he commutator for utilization in the armature coils connected to the commutator.

* * * * *